United States Patent
Das et al.

(10) Patent No.: US 7,471,455 B2
(45) Date of Patent: Dec. 30, 2008

(54) SYSTEMS AND METHODS FOR GENERATING LASER LIGHT SHAPED AS A LINE BEAM

(75) Inventors: Palash P. Das, Vista, CA (US); Albert P. Cefalo, San Diego, CA (US); David S. Knowles, San Diego, CA (US); Vitaliy Shklover, Koenigsbronn (DE); Holger Muenz, Aalen (DE)

(73) Assignee: Cymer, Inc., San Diego, CA (US)

( * ) Notice: Subject to any disclaimer, the term of this patent is extended or adjusted under 35 U.S.C. 154(b) by 265 days.

(21) Appl. No.: 11/261,948

(22) Filed: Oct. 28, 2005

(65) Prior Publication Data

US 2007/0097511 A1    May 3, 2007

(51) Int. Cl.
    *G02B 27/10* (2006.01)
(52) U.S. Cl. ..................... 359/618; 359/233
(58) Field of Classification Search ............... 372/55, 372/30, 34, 25; 356/400; 250/201.1; 219/121.83; 359/618, 227–236; 355/61; 362/232
See application file for complete search history.

(56) References Cited

U.S. PATENT DOCUMENTS

| | | | | |
|---|---|---|---|---|
| 4,843,431 A * | 6/1989 | Horiguchi et al. | ............. | 355/34 |
| 5,095,492 A | 3/1992 | Sandstrom | ................... | 372/102 |
| 5,721,416 A | 2/1998 | Burghardt et al. | ...... | 219/121.73 |
| 5,970,082 A | 10/1999 | Ershov | ........................ | 372/102 |
| 6,002,467 A * | 12/1999 | Nishi et al. | ..................... | 355/61 |
| 6,094,448 A | 7/2000 | Fomenkov et al. | .......... | 372/102 |
| 6,300,176 B1 * | 10/2001 | Zhang et al. | ................. | 438/166 |
| 6,567,450 B2 | 5/2003 | Myers et al. | ................... | 372/55 |
| 6,625,191 B2 | 9/2003 | Knowles et al. | ............... | 372/55 |
| 6,873,418 B1 | 3/2005 | Howey et al. | ................ | 356/451 |
| 6,894,785 B2 | 5/2005 | Rao et al. | .................... | 356/450 |
| 6,912,052 B2 | 6/2005 | Rao et al. | .................... | 356/451 |
| 6,963,595 B2 | 11/2005 | Rule et al. | ..................... | 372/55 |
| 6,985,508 B2 | 1/2006 | Knowles et al. | ............... | 372/55 |
| 7,002,443 B2 | 2/2006 | Ness et al. | ..................... | 336/57 |
| 7,030,958 B2 * | 4/2006 | Luijkx et al. | .................. | 355/30 |
| 7,039,086 B2 | 5/2006 | Fallon et al. | ................... | 372/55 |
| 7,202,141 B2 * | 4/2007 | Park et al. | ..................... | 438/458 |
| 2004/0182838 A1 | 9/2004 | Das et al. | ............... | 219/121.76 |
| 2005/0018739 A1 | 1/2005 | Ershov et al. | ................. | 372/55 |
| 2005/0035103 A1 | 2/2005 | Partlo et al. | ............ | 219/121.73 |
| 2005/0117336 A1 * | 6/2005 | Jenny | .......................... | 362/232 |
| 2005/0135451 A1 | 6/2005 | Rule et al. | ..................... | 372/55 |
| 2005/0259709 A1 * | 11/2005 | Das et al. | ....................... | 372/55 |
| 2006/0001878 A1 * | 1/2006 | Das et al. | ..................... | 356/400 |
| 2007/0096008 A1 * | 5/2007 | Akins et al. | .............. | 250/201.1 |

* cited by examiner

*Primary Examiner*—Scott J Sugarman
*Assistant Examiner*—Vipin M Patel
(74) *Attorney, Agent, or Firm*—Matthew K. Hillman

(57) ABSTRACT

Systems and methods are disclosed for shaping a laser beam for interaction with a film in which the laser beam travels along a beam path and defines a short-axis and a long-axis. In one aspect, the system may include a first short-axis element having an edge positioned at a distance, $d_1$, along the beam path from the film and a second short-axis element having an edge positioned at a distance, $d_2$, along the beam path from the film, with $d_2 < d_1$. An optic may be positioned along the beam path between the second element and the film for focusing the beam in the short-axis for interaction with the film. In another aspect, a system may be provided having a mechanism operative to selectively adjust the curvature of one or both of the edges of the short-axis element.

20 Claims, 3 Drawing Sheets

US 7,471,455 B2

SYSTEMS AND METHODS FOR GENERATING LASER LIGHT SHAPED AS A LINE BEAM

CROSS-REFERENCE TO RELATED APPLICATIONS

The present invention is related to U.S. application Ser. No. 10/781,251, titled "VERY HIGH ENERGY, HIGH STABILITY GAS DISCHARGE LASER SURFACE TREATMENT SYSTEM," filed on Feb. 18, 2004, to U.S. application Ser. No. 10/884,101, titled "LASER THIN FILM POLY-SILICON ANNEALING OPTICAL SYSTEM," filed on Jul. 1, 2004, and to U.S. application Ser. No. 11/138,001, titled "SYSTEMS AND METHODS FOR IMPLEMENTING AN INTERACTION BETWEEN A LASER SHAPED AS A LINE BEAM AND A FILM DEPOSITED ON A SUBSTRATE" filed on May 26, 2005, the disclosures of each of which are hereby incorporated by reference herein.

FIELD OF THE INVENTION

The present invention relates to systems and methods for generating laser light shaped as a line beam. Uses of laser light shaped as a line beam may include, but are not necessarily limited to, the melting of an amorphous silicon film to induce crystallization of the film upon resolidification of the melted segment, for the purpose of manufacturing thin film transistors (TFT's).

BACKGROUND OF THE INVENTION

Laser crystallization of an amorphous silicon film that has been deposited on a substrate, e.g., glass, represents a promising technology for the production of material films having relatively high electron mobilities. Once crystallized, this material can then be used to manufacture thin film transistors (TFT's) and in one particular application, TFT's suitable for use in relatively large liquid crystal displays (LCD's). Other applications for crystallized silicon films may include Organic LED (OLED), System on a Panel (SOP), flexible electronics and photovoltaics. In more quantitative terms, high volume production systems may be commercially available in the near future capable of quickly crystallizing a film having a thickness of about 90 nm and a width of about 700 mm or longer.

Laser crystallization may be performed using pulsed laser light that is optically shaped to a line beam, e.g., laser light that is focused in a first axis, e.g., the short-axis, and expanded in a second axis, e.g., the long-axis. Typically, the first and second axes are mutually orthogonal and both axes are approximately orthogonal to a central ray traveling toward the film. An exemplary line beam for laser crystallization may have a beam width at the film of less than about 20 microns, e.g. 3-4 microns, and a beam length of about 700 mm. With this arrangement, the film can be scanned or stepped in a direction parallel to the beam width to sequentially melt and subsequently crystallize a film having a substantial length, e.g., 900 mm or more.

In some cases, e.g. sequential lateral solidification processes, it may be desirable to ensure that the silicon film is exposed using a beam having an intensity that is relatively uniform across the short-axis and that drops off sharply at the short-axis edges (i.e. a beam having relatively steep, short-axis sidewalls). More specifically, failure to obtain a steep sidewall on the trailing short-axis edge may result in the undesirable crystal quality of new grains near the short-axis edge due to insufficient overlap between adjacent pulses.

Also, in some implementations, it may be desirable to have a steep sidewall on the leading short-axis edge to reduce surface variations and provide more consistent lateral growth.

One way to achieve this shape is to focus a laser at a short-axis element, e.g. field stop, which is shaped as an elongated slit that is aligned in the direction of the long-axis. An optic may then be used to produce an image of the short-axis element at the film. With this arrangement, a beam having relatively steep, short-axis sidewalls may be obtained. For the dimensions contemplated above, e.g. a beam width at the film of less than 20 microns, it may be important to control the dimensions of the short-axis element to relatively close tolerances. Establishing the slit shaped element may involve the positioning of two relatively large mass blocks to within approximately 20-100 microns of each other. Thus, this slightest error in positioning can cause the blocks to collide and damage the critical block edges which define the slit shaped element.

Another factor that must be considered when contemplating the crystallization of large films with the concomitant high power laser beams, is the heat generated at the slit shaped short-axis element. Large amounts of heat can distort the critical block edges which define the slit shaped element, and if severe, cause undesirable aberrations in the laser beam.

With the above in mind, Applicants disclose systems and methods for implementing an interaction between a shaped line beam and a film deposited on a substrate.

SUMMARY OF THE INVENTION

Systems and methods are provided for shaping a laser beam for interaction with a film, wherein the laser beam travels along a beam path and defines a short-axis and a long-axis. In one aspect of an embodiment of the present invention, the system may include a first short-axis element positioned for illumination by a portion of the beam and having an edge positioned at a distance, $d_1$, along the beam path from the film, and a second short-axis element positioned for illumination by a portion of the beam and having an edge positioned at a distance, $d_2$, along the beam path from the film, with $d_2<d_1$. An optic may be positioned along the beam path between the second element and the film for focusing the beam in the short-axis for interaction with the film.

In a particular embodiment of the system, a sequential lateral solidification apparatus is provided for melting an amorphous silicon film deposited on a substrate with a laser beam shaped as a line beam. The apparatus may include a moveable stage for holding the substrate and a laser source generating a laser beam on the beam path. The apparatus may further include a first short-axis element positioned for illumination by a portion of the beam and having an edge positioned at a distance, $d_1$, along the beam path from the film and a second short-axis element positioned for illumination by a portion of the beam and having an edge positioned at a distance, $d_2$, along the beam path from the film, with $d_2<d_1$.

In another aspect, a system may be provided for shaping a laser beam for interaction with a film and may include a short-axis element positioned for illumination by a portion of the beam and having an edge and a mechanism operative to selectively adjust the curvature of the edge. In one arrangement, the mechanism may be operative to adjust the curvature of the edge in a plane that is normal to the laser's beam path at the short-axis element.

DETAILED DESCRIPTION OF PREFERRED EMBODIMENTS

Figure 1:
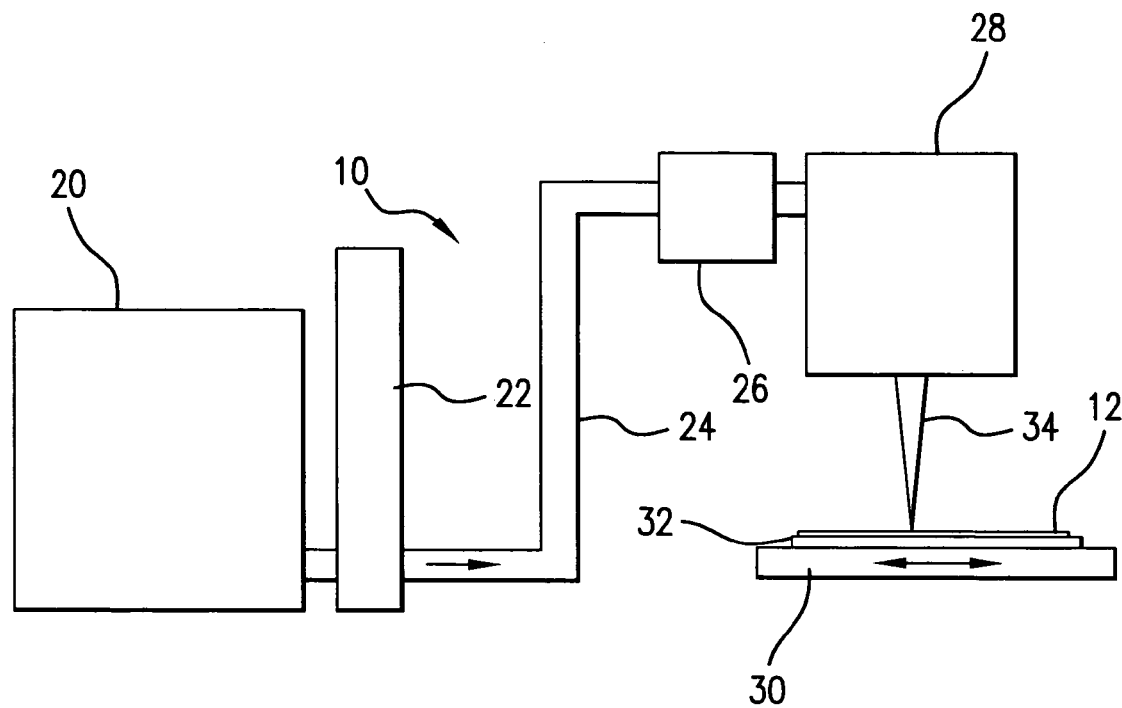
FIG. 1 shows a schematic view of the primary components of an exemplary production system for crystallizing an amorphous silicon film.

Referring initially to FIG. 1, there is shown a schematic, not to scale, view of the primary components of a production system, designated generally system 10, for crystallizing an amorphous silicon film 12. As shown, the system 10 may include a laser source 20 for generating a pulsed laser beam, a pulse stretcher 22 for increasing pulse duration and a beam delivery unit 24 which may have a mechanism to actively steer the beam and/or an active beam expander.

In overview, the laser source 20 may be a two chamber laser having a power oscillator and a power amplifier, and accordingly, is often referred to as a so-called POPA laser source. In one implementation of the crystallization process described above, a 6 Khz (6000 pulses per second) POPA laser may be used with pulse energies of approximately 150 mJ. With this arrangement, a 730 mm×920 mm film may be processed (with 60 percent overlap) in about 75 seconds. The power oscillator and the power amplifier each comprise a discharge chamber which may contain two elongated electrodes, a suitable laser gas, e.g., XeCl, XeF, a tangential fan for circulating the gas between the electrodes and one or more water-cooled finned heat exchangers (not shown).

It is to be appreciated that other types of laser sources could be used in the system 10, to include solid state lasers, excimer lasers having one chamber, excimer lasers having more than two chambers, e.g., an oscillator chamber and two amplifying chambers (with the amplifying chambers in parallel or in series), or a solid state laser that seeds one or more excimer amplifying chambers. Other designs are possible. Further details for a two chamber, gas discharge, pulsed laser source 20, can be found in U.S. application Ser. No. 10/631,349, entitled CONTROL SYSTEM FOR A TWO CHAMBER GAS DISCHARGE LASER, filed on Jul. 30, 2003, U.S. Ser. No. 10/356,168, entitled AUTOMATIC GAS CONTROL SYSTEM FOR A GAS DISCHARGE LASER, filed on Jan. 31, 2003, U.S. Ser. No. 10/740,659, entitled METHOD AND APPARATUS FOR CONTROLLING THE OUTPUT OF A GAS DISCHARGE MOPA LASER SYSTEM, filed on Dec. 18, 2003, U.S. Ser. No. 10/676,907, entitled GAS DISCHARGE MOPA LASER SPECTRAL ANALYSIS MODULE filed on Sep. 30, 2003, U.S. Ser. No. 10/676,224, entitled OPTICAL MOUNTINGS FOR GAS DISCHARGE MOPA LASER SPECTRAL ANALYSIS MODULE, filed Sep. 30, 2003, U.S. Ser. No. 10/676,175, entitled GAS DISCHARGE MOPA LASER SPECTRAL ANALYSIS MODULE, filed Sep. 30, 2003, U.S. Ser. No. 10/631,349, entitled CONTROL SYSTEM FOR A TWO CHAMBER GAS DISCHARGE LASER, filed Jul. 30, 2003, U.S. Ser. No. 10/627,215, entitled VERY NARROW BAND, TWO CHAMBER, HIGH REP-RATE GAS DISCHARGE LASER, filed on Jul. 24, 2003, U.S. Ser. No. 10/607,407, entitled METHOD AND APPARATUS FOR COOLING MAGNETIC CIRCUIT ELEMENTS, filed on Jun. 25, 2003, U.S. Ser. No. 10/922,692, entitled TIMING CONTROL FOR TWO-CHAMBER GAS DISCHARGE LASER SYSTEM, filed on Aug. 20, 2004, U.S. Pat. No. 6,625,191, entitled HIGH REP RATE MOPA LASER SYSTEM, and U.S. Pat. No. 6,567,450, entitled BASIC MODULAR MOPA LASER SYSTEM, the disclosures of all of which are hereby incorporated by reference herein.

Continuing with FIG. 1, the system 10 may further include a stabilization metrology module 26 for measuring one or more beam characteristics, e.g., wavefront and/or beam pointing, and generating control signals for use by the active steering unit and/or the active beam expander. System 10 may also include an optics module 28 for beam homogenization, beam shaping and/or beam focusing, and a moveable stage system 30 for holding and positioning a silicon film 12 that has been deposited on a substrate 32, which can be, for example, glass. A buffer material (not shown) may be interposed between the glass and the silicon film 12.

In overview, the system 10 shown in FIG. 1 and described in greater detail below can be configured to generate a focused thin beam 34, e.g. line beam, having a width at the film 12 of about 20 microns or less (short-axis), e.g. 34 microns, and a length of 700 mm or more (long-axis) and a depth of focus (DOF) of about +/−30 to 50 microns. Each pulse of the focused thin beam can be used to melt a strip of amorphous silicon, and after the end of the pulse, the molten strip crystallizes. In particular, the molten strip crystallizes in a lateral growth process in which grains grow in a direction parallel to the short-axis. Grains grow inward (parallel to the short-axis) from both edges and meet creating a ridge (a so-called grain boundary protrusion) along the center of the strip which extends out of the plane of the silicon film. The stage is then moved, either incrementally or continuously, to expose a second strip that is parallel to and overlaps a portion of the first strip. During exposure, the second strip melts and subsequently re-crystallizes. An overlap sufficient to re-melt the ridge may be used. By re-melting the ridge, a relatively flat film surface (e.g., peak-to-peak value of ~15 nm) may be maintained. This process, which is hereinafter referred to as thin beam, directional crystallization (TDX) is typically repeated until the entire film is crystallized.

Figure 2:
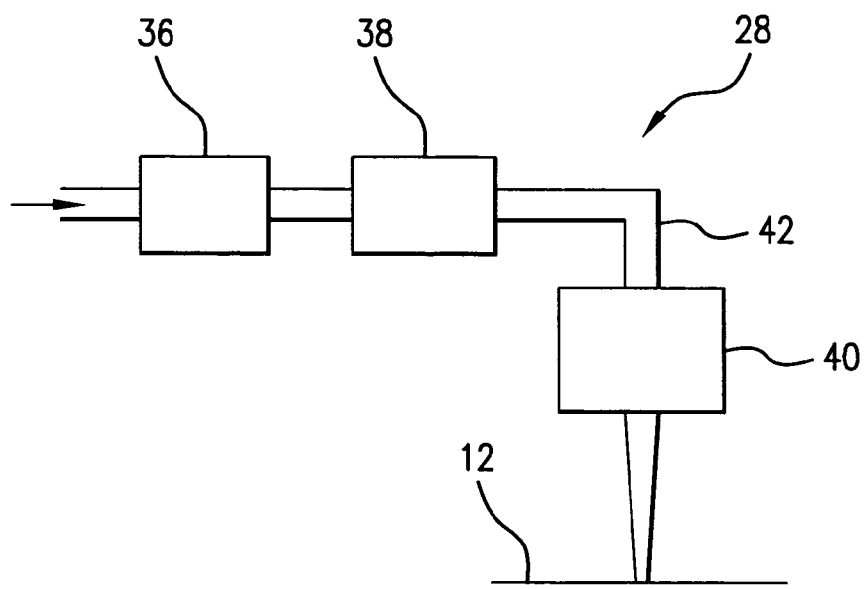
FIG. 2 shows a schematic view of optics module for beam homogenization, beam shaping and/or beam focusing.

FIG. 2 shows an example of an optics module 28 which may include a homogenizing unit 36, short-axis shaping unit 38 and short-axis focusing/long-axis expanding optics unit 40 that are arranged along a common beam path 42. When used, the homogenizing unit 36 may include one or more optics, e.g. lens arrays, distributed delay devices, etc., for homogenizing the beam in the short-axis and one or more optics, e.g. lens arrays, distributed delay devices, etc., for homogenizing the beam in the long-axis.

Figure 3A:
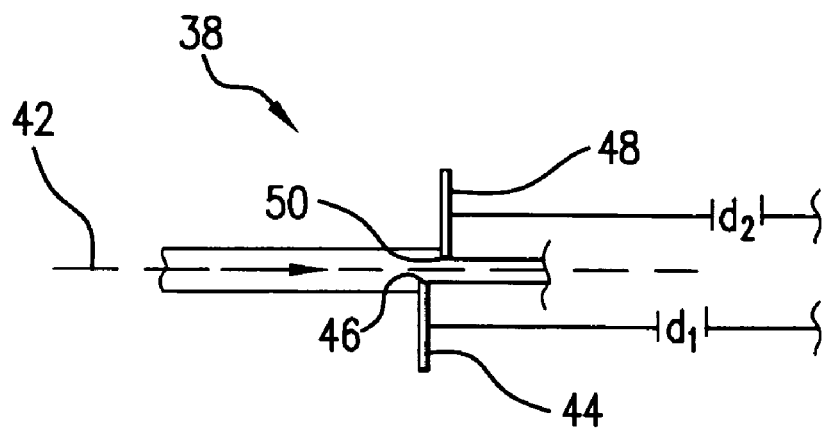
FIG. 3A shows a schematic view of a short-axis beam shaping component having absorptive stops.

The short-axis shaping unit 38 can perhaps best be appreciated with cross-reference to FIGS. 2 and 3A. As seen there, the short-axis shaping unit 38 may include may include a short-axis element 44 positioned for illumination by a portion of the beam and having an edge 46 positioned at a distance, $d_1$, along the beam path 42 from the film 12 (see FIG. 1) and a short-axis element 48 positioned for illumination by a portion of the beam and having an edge 50 positioned at a distance, $d_2$, along the beam path 42 from the film 12, with $d_2<d_1$. It is to be appreciated that these distances, $d_1$ and $d_2$, along the beam path 42, may not necessarily be straight-line distances. As shown, portion(s) of the beam traveling along the beam path 42 may strike the element(s) 44, 48 and a portion of the beam may pass through the short-axis shaping unit 38 without contacting either element. Separation of element 44 from element 48 along the beam path 42 may reduce or eliminate problems associated with heat generation at the elements and/or may facilitate the positioning of the elements relative to each other and the beam at close tolerances. One or more actuators (not shown) may be positioned along the length of one or both of the elements 44, 48 to adjust the spacing between the elements 44, 48 orthogonal to the beam path 42.

For the system 10, the elements 44, 48 may effectively aperture-limit the beam incident on the film 12. The excess energy in the tails of the beam may be dumped on the elements 44, 48 and not on the film 12. Also, advantageously, any small beam pointing deviation at the short-axis shaping unit 38 may be compensated for due to the fact that the beam at the short-axis shaping unit 38 is slightly larger than the spacing between the elements 44, 48 orthogonal to the beam path 42.

Figure 3B:
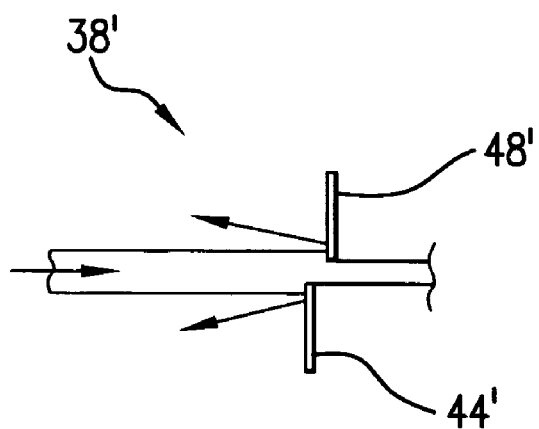
FIG. 3B shows a schematic view of a short-axis beam shaping component having reflective beam dividing elements.
Figure 3C:
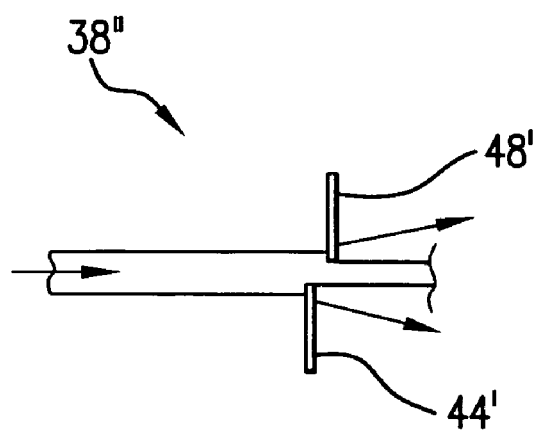
FIG. 3C shows a schematic view of a short-axis beam shaping component having refractive beam dividing elements.

For the system 10, the short-axis elements 44, 48 may be absorptive stops as shown in FIG. 3A for short-axis shaping unit 38, the short-axis elements 44', 48' may be reflective beam dividing elements as shown in FIG. 3B for short-axis shaping unit 38', or the short-axis elements 44", 48" may be refractive beam dividing elements as shown in FIG. 3C for short-axis shaping unit 38". As used herein, the term absorptive stop means a stop which absorbs more incident light than the sum of the incident light the stop reflects and refracts; the term reflective element means an element which reflects more incident light than the sum of the incident light the element absorbs and refracts; and the term refractive element means an element which refracts more incident light than the sum of the incident light the element absorbs and reflects.

FIG. 2 also shows that the optics module 28 may include a short-axis focusing/long-axis expanding optics unit 40 which receives light along the beam path 42 from the short-axis shaping unit 38. Typically, the beam is initially focused on a plane at or near the short-axis shaping unit 38 and this focal plane may then be imaged in the short-axis (by the short-axis focusing/long-axis expanding optics unit 40) to produce a desired intensity profile at the film 12. In one implementation, a desired intensity profile at the film 12 may include beam width (FWHM) of about 3-4 µm, an intensity uniformity better than about 5% along the flat top of the profile, and steep edge slopes that may be less than about 3 um between the 10% and 90% of full intensity.

A displacement (i.e. $d_1$-$d_2$) of element 44 with respect to element 48 along the beam path 42 leads to a shift of the image at the film 12. For example, in one optical setup, a displacement (i.e. $d_1$-$d_2$) of about 1 mm leads to a shift of the image at the film 12 of about 16 to 20 um. The depth of focus at the film 12, while being dependent on the numeric aperture NA of the short-axis focusing/long-axis expanding optics unit 40, is typically +/−30 to 50 um. Thus, the image shift (20 um) due to stop displacement of 1 mm is less than the DOF (+/−30 to 50 um). In one aspect, the displacement (i.e. $d_1$-$d_2$) of element 44 with respect to element 48 along the beam path 42 may be held within a range such that the image shift due to short-axis element displacement is less than the DOF.

Figure 4:
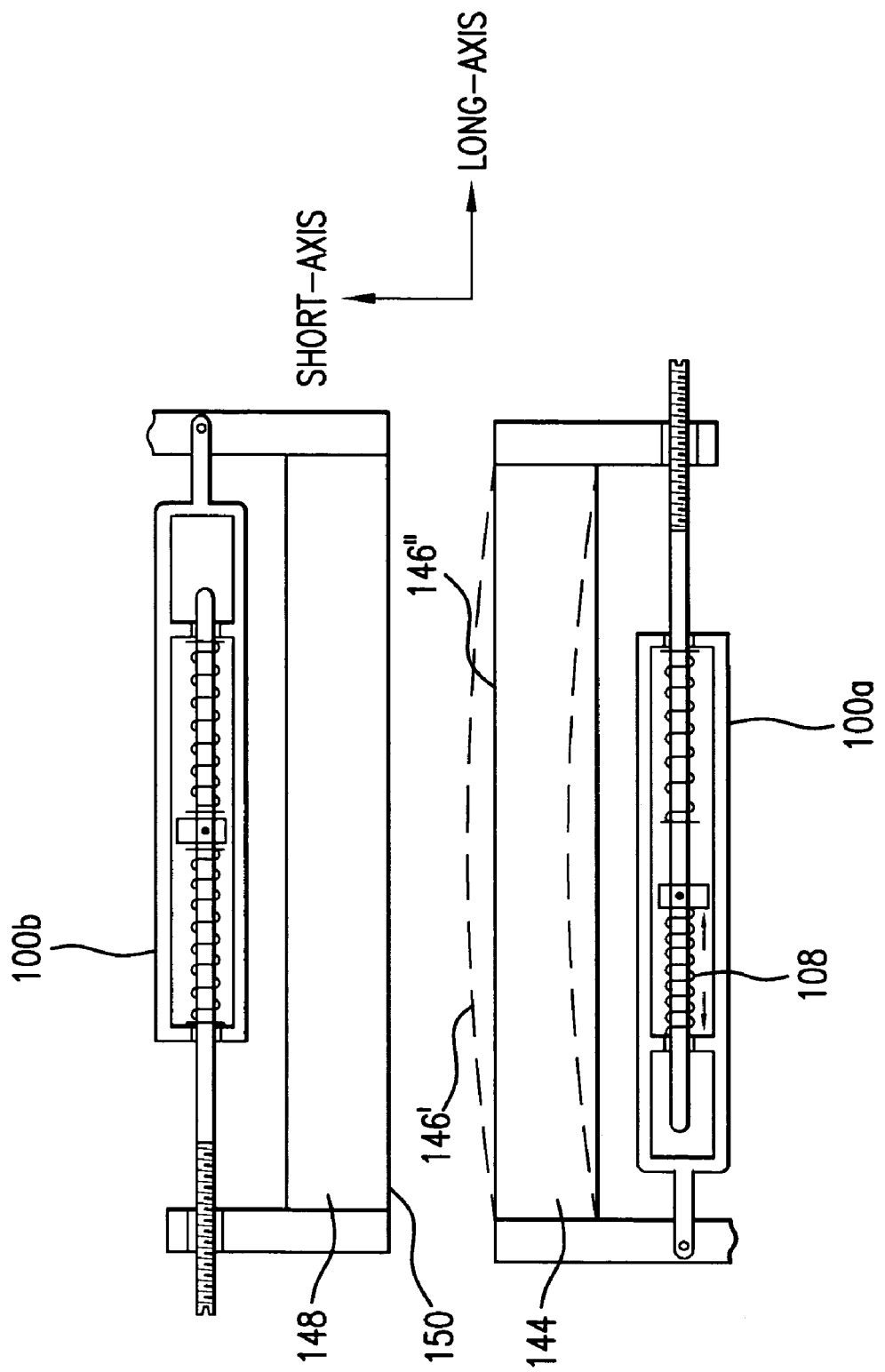
FIG. 4 shows a schematic view of a mechanism for adjusting the curvature of an edge of a short-axis element.

FIG. 4 illustrates a mechanism 100a for adjusting the curvature of an edge 146 of a short-axis element 144. For the system, the mechanism 100a may be used to straighten the edge 146 as shown. Alternatively, or in addition thereto, the mechanism 100a may be used to establish and/or maintain the edge 146 substantially parallel to the edge 150 of element 148. A curvature adjusting mechanism 100b may also be provided for edge 150 of element 148, as shown. For example, for a beam width at the film 12 of about 5 to 10 um and a short-axis focus magnification of 10×, the edges 146", 150 of the elements 144, 148 may be held parallel to within about 10 um to hold the beam edges parallel to within about 1 um at the film 12.

In operation, threaded rod 102 may be rotated relative to tube 104 to translate block 106 that is attached to rod 102 along the axis of rod 102. This movement compresses spring 108 and moves rod 102 and tube 104 in opposite axial directions. The result is a change in curvature of the element 144 from a first shape in which the element 144 has an edge 146' with a slightly concave curvature (dashed line) to a second shape in which the element 144 has an edge 146" that is substantially straight. The mechanism 100a is similar to a mechanism used to adjust the curvature of a grating as disclosed and described in further detail in U.S. Pat. No. 6,094,448 which issued on Jul. 25, 2000, is titled "Grating Assembly with Bi-directional Bandwidth Control", the contents of which are hereby incorporated by reference herein. Also, the mechanism which was previously disclosed to adjust the curvature of a grating in U.S. Pat. No. 5,095,492 which issue Mar. 10, 1992 and is titled "Spectral Narrowing Technique" may be used to adjust the curvature of the short axis element. The contents of U.S. Pat. No. 5,095,492 are hereby incorporated by reference herein. In addition, the mechanism which was previously disclosed to adjust the curvature of a grating in U.S. Pat. No. 5,970,082 which issue Oct. 19, 1999 and is titled "Very Narrow Band Laser" may be used to adjust the curvature of the short axis element. The contents of U.S. Pat. No. 5,970,082 are hereby incorporated by reference herein.

The mechanism for adjusting the curvature of an edge of a short-axis element can be used for elements which are offset along the beam path such as the elements shown in FIG. 3A (i.e. a short-axis element positioned at a distance, $d_1$, along the beam path from the film and a short-axis element positioned at a distance, $d_2$, along the beam path from the film, with $d_2<d_1$) or the mechanism for adjusting the curvature of an edge of a short-axis element can be used for elements which are aligned along the beam path (i.e. a short-axis element positioned at a distance, $d_1$, along the beam path from the film and a short-axis element positioned at a distance, $d_2$, along the beam path from the film, with $d_2=d_1$). In some arrangements, a single short-axis element may be used in place of the pair of elements shown in FIGS. 3A-C and 4 to produce a beam profile having a steep trailing edge slope (i.e., the edge corresponding to the material that will not be re-melted during the TDX process) while leaving the leading edge unaffected.

It will be understood by those skilled in the art that the aspects of embodiments of the present invention disclosed above are intended to be preferred embodiments only and not to limit the disclosure of the present invention(s) in any way and particularly not to a specific preferred embodiment alone. Many changes and modification can be made to the disclosed aspects of embodiments of the disclosed invention(s) that will be understood and appreciated by those skilled in the art. The appended claims are intended in scope and meaning to cover not only the disclosed aspects of embodiments of the present invention(s) but also such equivalents and other modifications and changes that would be apparent to those skilled in the art. While the particular aspects of embodiment(s) of the Systems and Methods for Implementing an Interaction between a Laser Shaped as a Line Beam and a Film Deposited on a Substrate described and illustrated in this patent application in the detail required to satisfy 35 U.S.C. §112 is fully capable of attaining any above-described purposes for, problems to be solved by or any other reasons for or objects of the aspects of an embodiment(s) above described, it is to be understood by those skilled in the art that it is the presently described aspects of the described embodiment(s) of the present invention are merely exemplary, illustrative and representative of the subject matter which is broadly contemplated by the present invention. The scope of the presently described and claimed aspects of embodiments fully encompasses other embodiments which may now be or may become obvious to those skilled in the art based on the teachings of the Specification. The scope of the present Systems and Methods for Implementing an Interaction between a Laser Shaped as a Line Beam and a Film Deposited on a Substrate is solely and completely limited by only the appended claims and nothing beyond the recitations of the appended claims. Reference to an element in such claims in the singular is not intended to mean nor shall it mean in interpreting such claim element "one and only one" unless explicitly so stated, but rather "one or more". All structural and functional equivalents to any of the elements of the above-described aspects of an embodiment(s) that are known or later come to be known to those of ordinary skill in the art are expressly incorporated herein by reference and are intended to be encompassed by the present claims. Any term used in the specification and/or in the claims and expressly given a meaning in the Specification and/or claims in the present application shall have that meaning, regardless of any dictionary or other commonly used meaning for such a term. It is not intended or necessary for a device or method discussed in the Specification as any aspect of an embodiment to address each and every problem sought to be solved by the aspects of embodiments disclosed in this application, for it to be encompassed by the present claims. No element, component, or method step in the present disclosure is intended to be dedicated to the public regardless of whether the element, component, or method step is explicitly recited in the claims. No claim element in the appended claims is to be construed under the provisions of 35 U.S.C. §112, sixth paragraph, unless the element is expressly recited using the phrase "means for" or, in the case of a method claim, the element is recited as a "step" instead of an "act".

We claim:

1. An apparatus for shaping a laser beam for interaction with a film, the beam traveling along a beam path and defining a short-axis and a long-axis, said axes being mutually orthogonal, said apparatus comprising:
    a first short-axis element positioned for illumination by a portion of said beam and having an edge positioned at a distance, $d_1$, along the beam path from said film;
    a second short-axis element positioned for illumination by a portion of said beam and having an edge positioned at a distance, $d_2$, along the beam path from said film, with $d_2 < d_1$; and
    an optic positioned along the beam path between said second short-axis element and said film for focusing said beam in the short-axis for interaction with the film.

2. An apparatus as recited in claim 1 wherein said edge of said first short-axis element is aligned substantially parallel to said edge of said second short-axis element.

3. An apparatus as recited in claim 1 wherein said first short-axis element is a reflective beam dividing element.

4. An apparatus as recited in claim 1 wherein said first short-axis element is an absorptive stop.

5. An apparatus as recited in claim 1 wherein said first short-axis element is a refractive beam dividing element.

6. An apparatus as recited in claim 1 further comprising a focusing optic positioned along the beam path between a laser source and said first short-axis element.

7. An apparatus its recited in claim 1 further comprising a short-axis homogenizing optic positioned along the beam path between a laser source and said first short-axis element.

8. A sequential lateral solidification apparatus for melting an amorphous silicon film deposited on a substrate with a laser beam shaped as a line beam, the beam traveling along a beam path and defining a short-axis and a long-axis, said axes being mutually orthogonal, said apparatus comprising:
    a moveable stage for holding the substrate;
    a laser source generating a laser beam on said beam path;
    a first short-axis element positioned for illumination by a portion of said beam and having an edge positioned at a distance, $d_1$, along the beam path from said film;
    a second short-axis element positioned for illumination by a portion of said beam and having an edge positioned at a distance $d_2$, along the beam path from said film, with $d_2 < d_1$; and
    an optic positioned along the beam path between said second short-axis element and said film for focusing said beam in the short-axis for interaction with the film.

9. An apparatus as recited in claim 8 wherein said edge of said first short-axis element is aligned substantially parallel to said edge of said second short-axis element.

10. An apparatus as recited in claim 8 wherein said first short-axis element is a reflective beam dividing element.

11. An apparatus as recited in claim 8 wherein said first short-axis element is an absorptive stop.

12. An apparatus as recited in claim 8 wherein said first short-axis element is a refractive beam dividing element.

13. An apparatus as recited in claim 8 further comprising a focusing optic positioned along the beam path between a laser source and said first short axis element.

14. An apparatus as recited in claim 8 further comprising a short-axis homogenizing optic positioned along the beam path between a laser source and said first short axis element.

15. An apparatus for shaping a laser beam for interaction with a film, the beam traveling along a beam path and defining a short-axis and a long-axis, said axes being mutually orthogonal, said apparatus comprising:
    a first short-axis element positioned for illumination by a portion of said beam and having an edge;
    a second short-axis element positioned for illumination by a portion of said beam and having an edge;
    a mechanism adjusting the curvature of said edge of said first short-axis element; and
    an optic positioned along the beam path between said first short-axis element and said film for focusing said beam in the short-axis for interaction with the film.

16. An apparatus as recited in claim 15 wherein said mechanism is operative to adjust the curvature of said edge of said first short-axis element in a plane normal to said beam path at the first short-axis element.

17. An apparatus as recited in claim 15 wherein said edge of said first short-axis element is positioned at a distance, $d_1$, along the beam path from said film and said edge of said second short-axis element is positioned at a distance, $d_2$, along the beam path from said film, with $d_2 < d_1$.

18. An apparatus as recited in claim 15 wherein said first short-axis element is a reflective beam dividing element.

19. An apparatus as recited in claim 15 wherein said first short-axis element is an absorptive stop.

20. An apparatus as recited in claim 15 wherein said first short-axis element is a refractive beam dividing element.

* * * * *